(12) United States Patent
Holder et al.

(10) Patent No.: US 6,622,664 B2
(45) Date of Patent: Sep. 23, 2003

(54) FUEL SUPPLY SYSTEM

(75) Inventors: Eberhard Holder, Kusterdingen (DE); Roland Kemmler, Stuttgart (DE); Martin Matt, Bruchsal-Untergrombach (DE); Viktor Pfeffer, Ostfildem (DE); Carsten Plog, Markdorf (DE); Thomas Stengel, Friedrichshafen (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 10/016,817

(22) Filed: Dec. 13, 2001

(65) Prior Publication Data

US 2002/0152999 A1 Oct. 24, 2002

Related U.S. Application Data

(63) Continuation-in-part of application No. PCT/EP00/03700, filed on Apr. 26, 2000.

(30) Foreign Application Priority Data

Jun. 15, 1999 (DE) .......................................... 199 27 174

(51) Int. Cl.$^7$ ............................................. H02M 13/04
(52) U.S. Cl. ........................................... 123/3; 123/575
(58) Field of Search ..................................... 123/3, 575

(56) References Cited

U.S. PATENT DOCUMENTS

| 2,865,355 | A |   | 12/1958 | Hilton |
|---|---|---|---|---|
| 3,794,000 | A | * | 2/1974 | Hodgkinson ................ 123/557 |
| 4,876,989 | A |   | 10/1989 | Karpuk et al. |
| 5,357,908 | A | * | 10/1994 | Sung et al. .................... 123/3 |
| 5,546,908 | A |   | 8/1996 | Stokes |

FOREIGN PATENT DOCUMENTS

| DE | 4 220 120 | 9/1980 |
|---|---|---|
| DE | 196 52 861 | 4/1998 |
| DE | 197 13 841 | 11/1998 |
| DE | 197 34 493 | 11/1998 |
| EP | 0 060 976 | 9/1982 |
| WO | WO 99/06683 | 2/1999 |

* cited by examiner

*Primary Examiner*—Noah P. Kamen
(74) *Attorney, Agent, or Firm*—Klaus J. Bach

(57) ABSTRACT

In a fuel supply system for an internal combustion engine including a fuel tank, a fuel processing apparatus to which fuel from the tank is supplied and which separates the fuel into different fractions, the fuel and the fractions are mixed in a mixing chamber according to a performance graph stored in a control unit depending on the operating state of the engine and the mixture is then supplied to the engine in a controlled manner.

8 Claims, 2 Drawing Sheets

FUEL SUPPLY SYSTEM

This is a continuation-in-part application of international application PCT/EP00/03700 filed Apr. 26, 2000 and claiming the priority of German application 199 27 174.7 filed Jun. 15, 1999.

BACKGROUND OF THE INVENTION

The invention relates to a fuel supply system for an internal combustion engine for motor vehicles such as trucks, passenger cars, and buses, which include a fuel tank for liquid fuel from which fuel is supplied to a fuel processing apparatus by which the fuel is separated into fractions which are then supplied to the different cylinders of the engine depending on the operating conditions of the engine.

The fuels available presently for the operation of internal combustion engines of motor vehicles are a compromise between limits established by the fuel manufacturers, for example because of different crude oil qualities, processing equipment, costs and energy requirements and which are, on the other hand, partially requirements contrary to those of the internal combustion engine, based on cold start capability even at extremely low temperatures, low exhaust gas and evaporation emissions, low fuel consumption, high knock resistance also in supercharged engines, low or no corrosion, low sulfur content, smooth engine operation and high safety.

In order to be able to adapt the available fuels better to the requirements of the internal combustion engine, fuel supply and preparation apparatus are provided.

U.S. Pat. No. 4,220,120 discloses a fuel supply system with a fuel processing apparatus, including a fuel tank for liquid fuel, a fuel processing device to which fuel from the tank is supplied and which produces at least two different fuel parts for admission to the engine. Control means are provided which make it possible to supply the respective fuel parts and the fuel separately to the internal combustion engine depending on certain operating conditions of the engine. The control means include a mixing structure to which the fuel or the fuel parts are first supplied and which produces therefrom a mixture which is dependent on the operating conditions of the engine and which is then supplied to the internal combustion engine.

DE 197 34 493 C1 discloses another fuel supply system with a fuel tank for liquid fuel. It further includes a fuel processing apparatus, that is, an evaporation and condensation structure to which the fuel from the fuel tank is supplied and which generates therefrom a highly volatile fuel fraction and a fuel fraction of lower volatility and which supplies the two fuel components to the engine. The high volatility fuel fraction is stored in an intermediate tank 16 and the low volatility fuel fraction is stored in an auxiliary tank 21. Furthermore, the known fuel supply system includes a main fuel pump 5 whose suction side is connected, by way of a first switch-over valve 6 either to the fuel tank containing the fuel or to the additional tank containing the low volatility fuel and whose pressure side is connected to a first inlet of a second switch-over valve 3. A second inlet of this second switchover valve 3 is connected to the pressure side of an auxiliary fuel pump 17 whose inlet is connected to the intermediate tank containing the high volatility fuel fraction. The outlet side of this switchover valve 3 leads to the internal combustion engine. With the different fuel pumps, the first switchover valve and the second switchover valve and a corresponding control arrangement, this known fuel system can supply the respective fuel parts separately to the engine depending on certain engine operating conditions.

For the start up of the internal combustion engine and during a warm-up phase, the auxiliary fuel pump 17 is operated so that, by way of the second switchover valve 3, exclusively high volatile fuel is supplied to the engine. Under full load engine operation, when the main fuel pump 7 is operated, the switchover valve 6 is so actuated that the low volatile fuel is supplied from the additional tank 21 to the engine. Under all intermediate operating conditions of the internal combustion engine, the switch-over valve 6 is so controlled that the fuel from the fuel tank is supplied by the main fuel pump to the engine.

The present invention is concerned with the problem of improving the capability of such a fuel supply system to adapt the available fuel to the requirements of the internal combustion engine.

SUMMARY OF THE INVENTION

In a fuel supply system for an internal combustion engine including a fuel tank, a fuel processing apparatus to which fuel from the tank is supplied and which separates the fuel into different fractions, the fuel and the fractions are mixed in a mixing chamber according to a performance graph stored in a control unit depending on the operating state of the engine and the mixture is then supplied to the engine in a controlled manner.

The invention is based on the general concept of separating the fuel supplied from the fuel tank by means of a fuel processing system into fuel fractions, that is, into the individual components or component mixtures of the fuel in the tank and to form from these fractions, in a mixing apparatus, a fuel mixture which is optimal for the momentary operating state of the internal combustion engine. The fuel mixture to be supplied to the engine is provided by controlled mixing of the previously separated fuel fractions with each other or with fuel from the fuel tank.

For this purpose, the mixing apparatus preferably includes a suitable control unit, which determines from a performance graph the optimal fuel mixture for the momentary operating state of the engine and adjusts the mixing apparatus so as to provide the optimum mixture. The optimal mixture for the various engine-operating conditions can be determined, for example, by field-testing and the values can be stored so as to be available for the adjustment of the mixture. The engine operating data for determining the momentary engine operating state are available to the mixing apparatus control unit from the electronic engine operating control unit so that no special means are necessary to collect the respective engine operating data.

In a preferred embodiment, the fuel fractions produced by the fuel processing system may differ by their boiling temperatures and/or their sulfur content and/or their cetane number and/or their reduction medium content. A fuel fraction of high volatility, that is one with a low boiling temperature, results with gasoline fuels for example in a large reduction of the HC emissions of the internal combustion engine. In contrast, a fuel fraction with a higher boiling temperature, which has a higher octane number, permits an increase of the power output of the engine and, at the same time, provides for lower fuel consumption. With a fuel, which has a low boiling point and a low sulfur content, poisoning of the catalytic converter can be avoided, particularly with direct fuel injection engine using the stratified charge principle. But an engine using a fuel fraction with a high boiling point and a high sulfur content and high octane number operates at or under full load essentially stoichiometrically. In connection with Diesel fuel, a fuel fraction with a reduced cetane number may be provided during normal operation of the internal combustion engine; for cold start and during warm-up, a fuel fraction with a higher Cetane number is advantageous. Furthermore, a fuel fraction with an increased reduction medium content may improve the engine emission values particularly for the after-treatment of the exhaust gases when the engine is operated with a lean mixture.

Further features and advantages of the fuel system according to the invention will become apparent from the following description of the invention on the basis of the accompanying drawings.

DESCRIPTION OF PREFERRED EMBODIMENTS

Figure 1:
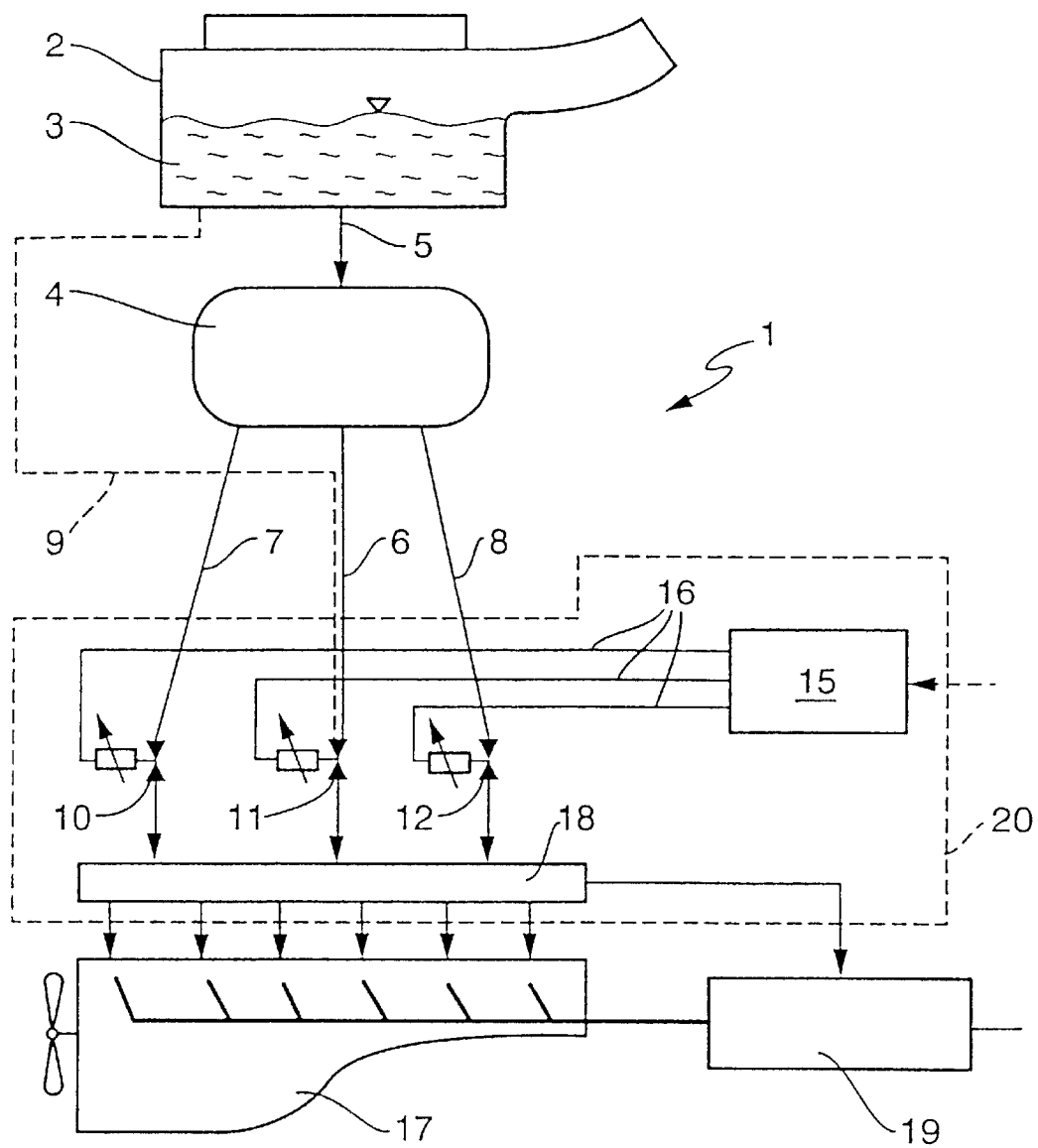
FIG. 1 is a circuit-like schematic representation of an embodiment of the fuel supply system according to the invention.
Figure 2:
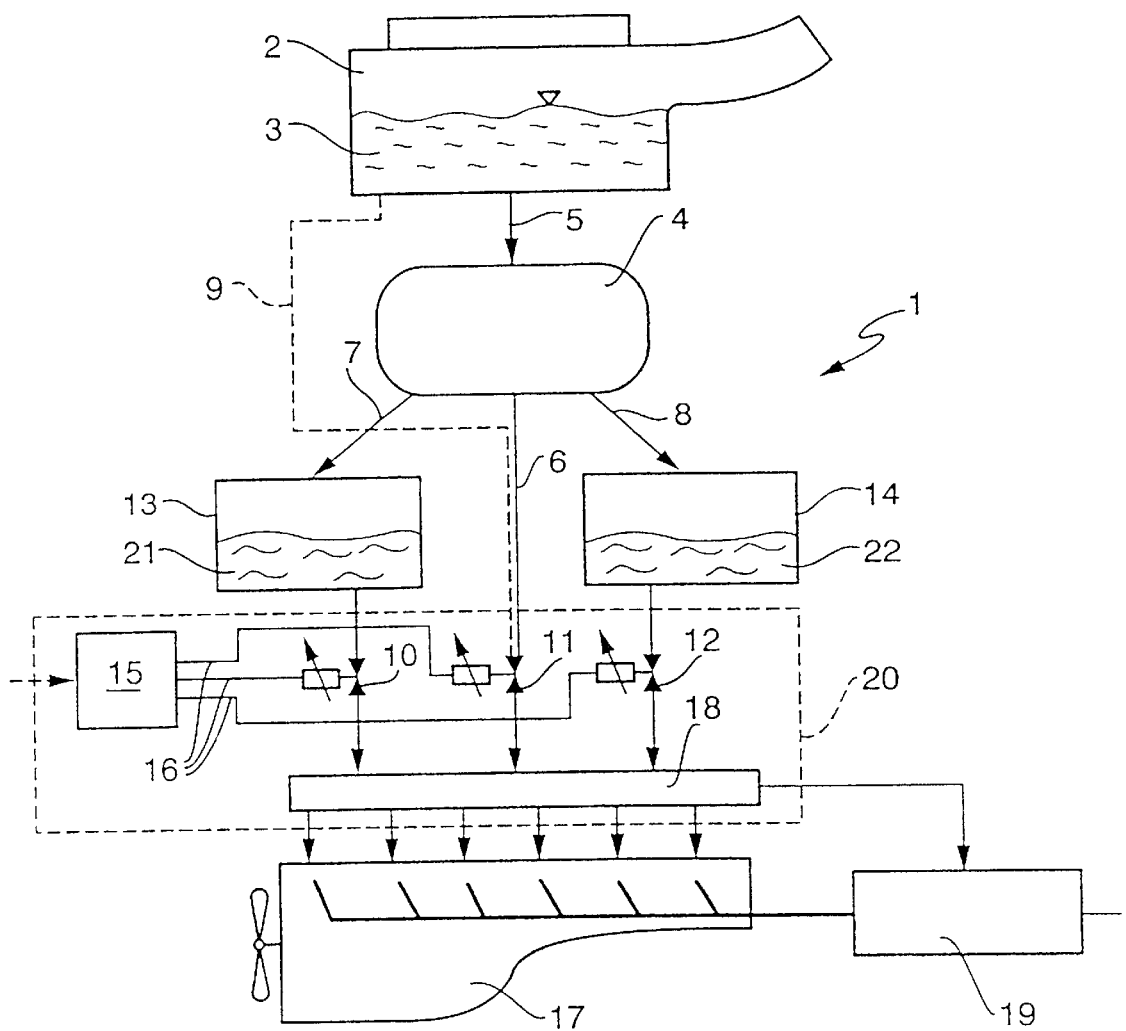
FIG. 2 shows a second embodiment of the fuel supply system according to the invention.

As shown in FIGS. 1 and 2, the fuel supply system 1 according to the invention includes a fuel tank 2 for storing liquid fuel 3. The fuel supply system 1 further includes a fuel processing apparatus 4, which is connected to the fuel tank (arrow 5) to receive fuel therefrom. The fuel processing apparatus 4 has a first fuel outlet 6 for releasing unmodified fuel 3 from the fuel tank 2, a second fuel outlet 7 for releasing a first fuel fraction (see 21 in FIG. 2), for example, a fuel fraction with a relatively low boiling point, and a third outlet 8 for releasing a second fuel fraction (see 22 in FIG. 2) for example a fuel fraction with a relatively high boiling point. Alternatively to the first outlet 6, a fuel line 9 may be provided which bypasses the fuel processing apparatus 4 and which is shown by a dashed line.

The fuel processing apparatus 4 can separate the fuel for example by vacuum evaporation using a vacuum pump and subsequent pressure condensation, whereby the fuel can be separated into a fuel fraction with a low boiling point and another fraction with a higher boiling point (see DE 197 13 841 C1). The fuel processing apparatus 4 may also include a separation column including adsorption material which provides for fuel fractions from the fuel by a chromatographic procedure (See DE 196 52 681 C1).

In the embodiment as shown in FIG. 1, the fuel lines 6 and, respectively, 9 as well as the fuel lines 7 and 8 are directly provided with respective flow control valves 10, 11, and 12. In the embodiment of FIG. 2, the fuel processing apparatus includes for each fuel fraction 21 and 22 a separate storage tank 13 and 14, which are connected to the respective flow control valve 10 and 12. The flow control valves 10, 11, and 12 are controllable as to the flow volume they permit to pass by a control unit 15 by way of control lines 16. The control unit 15 is coupled at the input side thereof for example to an engine control unit and receives therefrom parameter values which make it possible for the control unit 15 to determine the momentary operating state of an internal combustion engine 17. Depending on the momentary operating state of the internal combustion engine 17, the control unit 15 determines the optimal fuel mixture and the control values of the flow control valves 10, 11 and 12 needed for obtaining this fuel mixture. The control unit 15 then operates the flow control valves by way of the control lines 16 in such a way that the desired fuel mixture is obtained by mixing the fuel fractions 21, 22 and, if appropriate, also the fuel 3.

In an alternative embodiment, the composition of the original fuel can be reproduced by recombination of the fuel fractions 21 and 22 with the corresponding mixture ratio. In such an embodiment, the fuel lines 6 and respectively, 9 and the respective flow control valve 11 can be omitted.

For mixing the fuel, the fuel lines 6, or respectively, 9, and 7 and 8 extend downstream of the respective flow control valves 10, 11, 12 to a common mixing chamber 18 in which the individual fractions of the fuel are mixed to form the desired fuel mixture which is then supplied to the individual cylinders or, respectively, combustion chambers of the internal combustion engine 17. It may also be necessary to supply fuel mixture to an exhaust gas cleaning device 19 disposed downstream of the engine in order to improve the cleaning capability of the device 19 or to regenerate the cleaning device.

The individual flow control valves 10, 11, 12 form a control valve arrangement which may also be provided by a single control valve structure designed so as to control the various fuel flows.

Under certain operating conditions of the internal combustion engine 17, a particular fuel fraction 21 or 22 or the original fuel 3 may form the optimal fuel mixture un-mixed with any other fuel fraction. Then the respective flow control valve 10, 11, or 12 is fully opened and the other two flow control valves 10, 11, or 12 remain closed. In this way, the fuel flow control valves 10, 11, and 12 represent control means by which the fuel fractions 21 and 22 and the original fuel 3 can be separately supplied to the internal combustion engine 17.

The flow control valves 10, 11, 12, the mixing chamber 18 and the control unit 15 form a mixing structure 20, which is indicated in the figures by a dashed-line enclosure. This mixing structure 20 receives as input the fuel fractions 21 and 22 as well as the original fuel 3 and produces therefrom, by mixing, the fuel mixture which is optimal for the momentary engine operating state.

The mixing chamber may be formed in a suitable manner by a fuel distributor of a fuel injection apparatus of the internal combustion engine 17. In that case, the fuel distributor of the fuel injection apparatus supplies the prepared fuel mixture the injection nozzles. The injection nozzles or valves then inject the fuel mixture into the individual combustion chambers of the internal combustion engine in the conventional manner.

As far as the inventive concept is concerned it is unimportant, whether the fuel fractions are present in gaseous or in liquid form.

If the fuel supply system 1 is provided for a motor vehicle such as a truck, a passenger car or a bus, the onboard fuel supply system can supply the optimal fuel mixture for every operating state of the internal combustion engine 17 in an accurately predetermined manner.

What is claimed is:

1. A fuel supply system for an internal combustion engine including a fuel tank for receiving and storing liquid fuel, a fuel processing apparatus having a fuel input connected to said fuel tank for receiving fuel therefrom, and being capable of dividing said fuel from said fuel tank into at least two fractions having different properties, a storage tank for each fuel fraction for receiving the different fuel fractions, supply lines connected to said storage tanks and said fuel tank for supplying selectively at least one of said fractions and said fuel to said engine supply line including a fuel flow control device for controlling the supply of said fuel fractions and said fuel to said engine in proportions selected depending on the momentary operating state of said engine, a mixing structure in communication with said flow control devices for receiving the fuel fractions and fuel therefrom and for mixing the fuel proportions received from said flow control device and forming a mixture for supply to said internal combustion engine, and a control unit connected to said fluid flow control devices and including a performance graph having stored therein the optimum values for the fuel mixture for any engine operating state and providing said optimum value for controlling the flow control devices so as to provide the optimum fuel mixture to the internal combustion engine at any momentary engine operating state.

2. A fuel supply system according to claim 1, wherein said mixing structure is disposed in a fuel distributor of a fuel injection system of an internal combustion engine, which supplies a prepared fuel mixture to the injectors of a fuel injection system of said internal combustion engine.

3. A fuel supply system according to claim 1, wherein said fuel fractions differ from each other with regard to at least one of their boiling point, their sulfur content, their cetane number, and their reduction medium content.

4. A fuel supply system according to claim 1, wherein at least one of said fuel fractions is gaseous.

5. A fuel supply system according to claim 1, wherein said fuel flow control device includes a separate flow control valve for each fuel or fuel fraction supply line.

6. A fuel supply system according to claim 1, wherein, under certain operating conditions, only a particular fuel fraction or the fuel from said tank is provided to the engine.

7. A fuel supply system according to claim 1, wherein said fuel fractions are mixed under certain operating conditions so as to provide a mixture corresponding to the original fuel present in the tank.

8. A fuel supply system according to claim 1, wherein said fuel supply system is installed in a vehicle including a truck, a passenger car and a bus.

* * * * *